July 20, 1954  E. L. BARRETT  2,684,396
BATTERY PLATE

Filed May 31, 1952  2 Sheets-Sheet 1

INVENTOR
Edward L. Barrett
Carlson, Pitzner, Hubbard & Wolfe
ATTORNEYS

July 20, 1954 — E. L. BARRETT — 2,684,396
BATTERY PLATE
Filed May 31, 1952 — 2 Sheets-Sheet 2
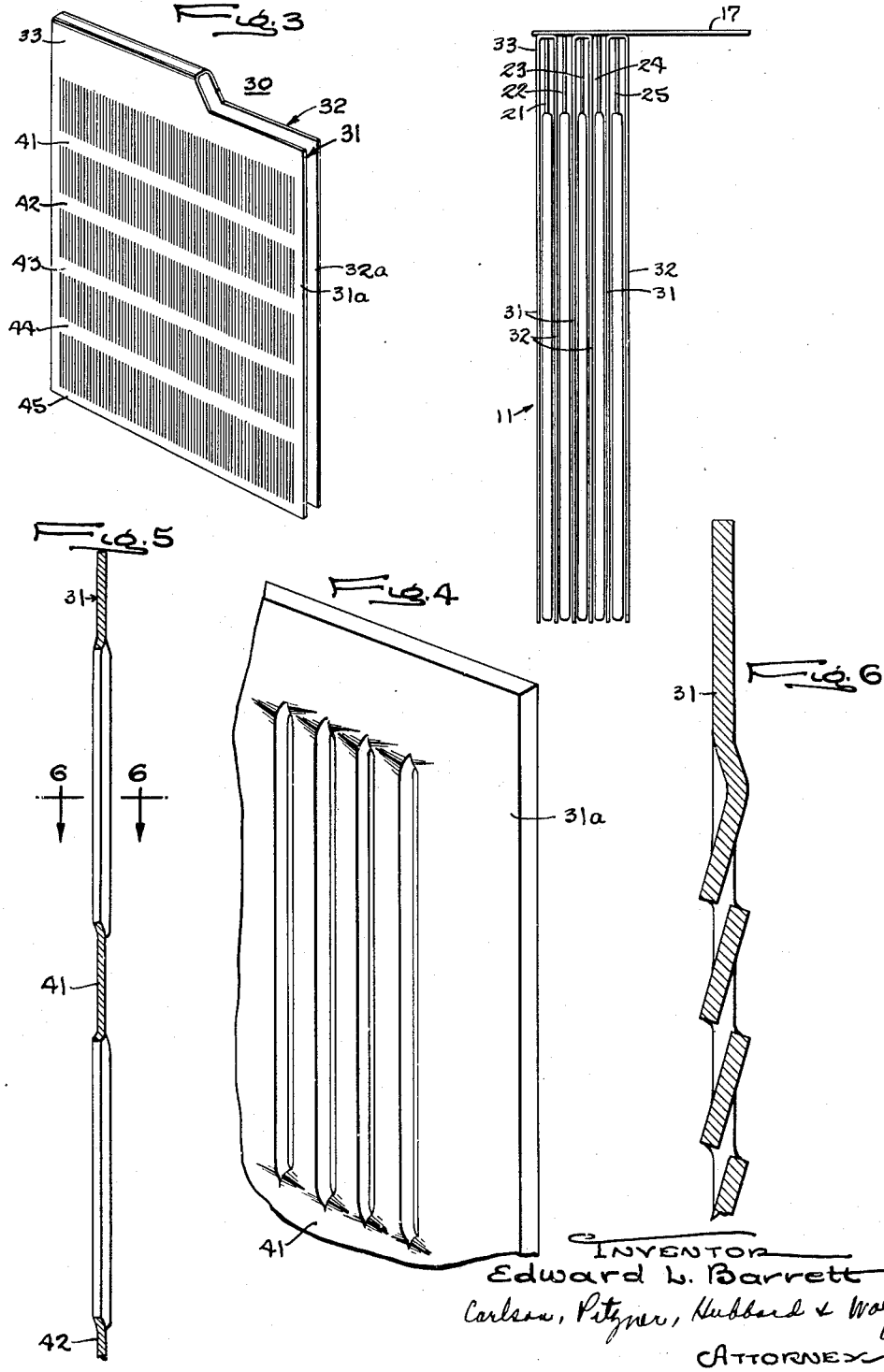
INVENTOR
Edward L. Barrett
Carlson, Pitzner, Hubbard & Wolfe
ATTORNEYS Patented July 20, 1954

2,684,396

UNITED STATES PATENT OFFICE 2,684,396

BATTERY PLATE

Edward L. Barrett, La Grange, Ill., assignor to Donald B. Alexander, Edgar R. Bourke, Henry T. Chamberlain, John F. Mannion, Ernest W. Schneider, Walter A. Wade, and Charles S. Vrtis, not individually but as trustees of The Arthur J. Schmitt Foundation, a charitable trust Application May 31, 1952, Serial No. 290,931

7 Claims. (Cl. 136—130)

The present invention relates to batteries, and more particularly to batteries of the silver-zinc-alkali type.

In batteries of the silver-zinc-alkali type it is necessary in some applications to obtain an amount of energy much greater than that normally obtainable from more conventional batteries such as lead cells. Furthermore, it is necessary in special applications, such as guided missiles, to produce sustained output currents for short periods of time on the order of one to two minutes. Load currents on the order of 50 to 100 amperes must be obtained from a battery occupying approximately 10 cubic inches and weighing only a few ounces. Since the control circuits of a guided missile are absolutely dependent upon the battery for their operation, reliability is a primary factor.

Because of the extremely severe operating conditions it has been difficult to design a battery capable of meeting all military requirements. Conventional silver-zinc-alkali batteries have employed zinc screens as the negative electrode in an endeavor to obtain a large surface area exposed to the electrolyte, the zinc being converted to zinc oxide during the discharge. The output characteristics of the zinc screen negative plates have not been satisfactory and considerable research has been carried on in which the electrode construction and composition have been varied over rather wide limits. It has been almost invariably found upon inspecting a plate after discharge that only a small portion of the zinc has been converted and that such conversion has occurred non-uniformly across the surface.

Accordingly, it is an object of the present invention to provide a negative battery plate in which the zinc is more efficiently utilized and which gives reliable results for all normally encountered conditions of discharge. More particularly, it is an object of the invention to provide a zinc plate in which conversion of the zinc takes place uniformly, with the entire area of the plate effective in the discharge, and in which the energy output under circuit conditions exceeds that which is obtainable using more conventional plates. It is another object of the invention to provide a zinc plate which is not only efficient in energy production, but which may be constructed easily and cheaply and in which the disadvantages associated with screen plates are effectively overcome.

Other objects and advantages of the invention will be apparent from the attached specification and drawings, in which:

Fig. 2 is a fragmentary end view showing the negative plates and wrapped positive plates.

Fig. 3 shows in perspective a pair of negative plates integrally formed.

Fig. 4 is a fragmentary view of one corner of the improved plate construction.

Fig. 5 is a fragmentary sectional view.

Fig. 6 is a fragmentary section taken along the line 6—6 of Fig. 5.

While only one form of the invention has been illustrated, it will be understood that the invention is susceptible of various modifications and alternative constructions and uses; accordingly it will be understood that I do not intend to limit the invention to the illustrated embodiment but intend to cover all of the modifications and alternatives falling within the spirit and scope of the appended claims.

Figure 1:
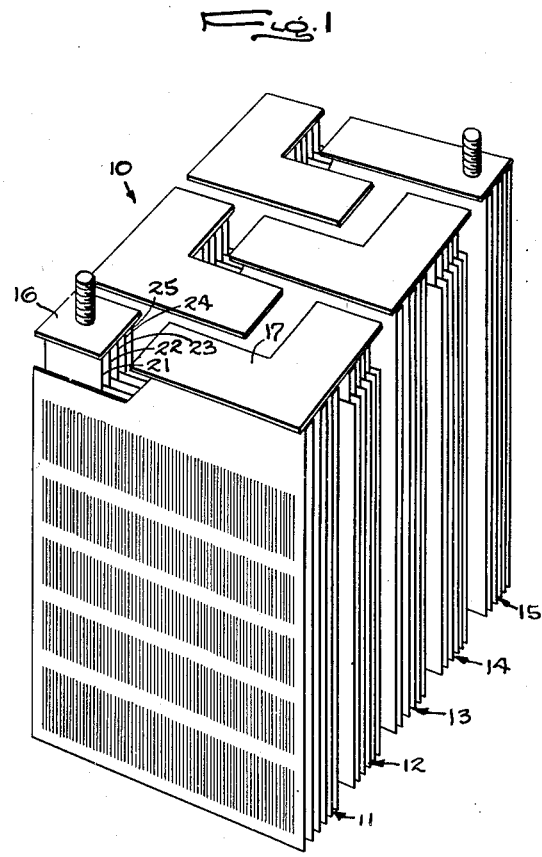
Figure 1 shows an assembled battery employing my improved negative plate.

Referring now to Figure 1, the assembled battery is indicated at 10. The battery shown consists of five cells 11–15. It will be understood that an appropriate case is provided which includes separators for isolating the respective cells. The terminals of the first cell, taken by way of example, are indicated at 16 and 17, respectively. The terminal 16, which is the positive terminal, is connected to a set of silver plates, 21–25 (see Fig. 2) which have been coated with silver peroxide. In a practical battery the plates are generally made of silver screen with the silver peroxide formed in situ and filling the screen openings. These positive plates are surrounded by an appropriate porous barrier and separator which serves not only to separate them from the negative plates, but also to absorb the potassium hydroxide solution which serves as the electrolyte. In the form of the invention shown in Fig. 2 the negative plates indicated at 30 are arranged in pairs, the first pair of plates 31, 32 being formed integrally with one another. All of the plates are soldered or otherwise fastened to the terminal 17.

As shown in Fig. 3, the plate 31 is of louvered construction, the louvers covering substantially the entire area of the plate. The louvers are not, however, brought up to the top edge of the plate. Here a terminal portion or "header" 33 is provided which serves to conduct electricity to the terminal 17. In accordance with the present invention, the louvers are integrally formed parallel to one another and extend vertically in the plate along the line of current flow. The louvers are spaced extremely close together and have a width which is on the order of 1/64 to 1/32 of an inch. It will be noted that the louvers do not extend continuously in the vertical direction, but are arranged in rows separated by transversely extending ribs 41-45, inclusive. The ribs terminate, as clearly shown in the drawings, in integral, unlouvered risers 31a, 32a through which current may flow from the ends of the ribs to the header 33. As shown in the detailed drawings, Figs. 4, 6, all of the individual louvers are oriented at the same angle, the angle being determined by the dies which are used to cut the louvers in the plate. In a practical case I have employed zinc having a thickness of .006 of an inch, in other words, a thickness which is on the order of a third to a fifth or so of the louver width. Each of the louvers has been angled to provide an overall final thickness of about three times the thickness of the base metal, namely, .018 of an inch. The angling of the louvers may, of course, be varied slightly without departing from the invention. As shown in Figs. 5 and 6, the louvers are so angled that the edges thereof extend beyond the plane of the plate on both sides thereof. The advantages of such arrangement in providing even spacing from adjacent separators or the like will be obvious to one skilled in the art.

In practice, it is found that the utilization of the zinc occurs much more uniformly over the entire area of the plate than in the case of the zinc plate constructed of screen. It is believed that the shortcomings of the screen plate can be explained on the ground that the wires forming the screen become unbonded at the junctures during the course of discharge. As a result, the wires do not form a closely spaced conducting grid or network, but rather act as individual conductors having rather high resistance. This is particularly true in the case of those wires which extend generally at right angles to the direction of current flow. It will be appreciated by one skilled in the art that since the louvers are all oriented in the direction of current flow in the present device, the individual conducting paths have minimum resistance, even when the zinc has been partially consumed.

The only conductors arranged at right angles to the current flow are the ribs 41-45. Being integral with the louvers, these serve the useful function of distributing the current flow from one set of louvers to the set of louvers lying immediately above. The ribs are of very low resistance and therefore may be considered as intermediate headers or bus bar connections connected to the integral risers 31a, 32a. In distributing the current flow from one set of louvers to the set immediately above, current will tend to flow along the ribs not only into the risers but also into the louvers having the lowest resistance, which are therefore best equipped to handle the current flow. A condition of equilibrium is established over the entire plate, which is maintained until the plate has completed the discharge cycle. There is no tendency for the current load to be localized in the vicinity of the terminal or at any other limited area. Consequently, the zinc is utilized evenly over the entire area of the plate and the disadvantages associated with unbonding of the conductors are entirely eliminated. As shown in the drawings, the louvers have substantially the same width throughout their entire length. Thus, the resistance of the louvered plate in the direction of current flow is substantially the same as the resistance of the blank from which the plate is formed.

The present plate construction, in addition to producing reliable output and high short-circuit current, includes a number of advantages which should not be overlooked. One of the difficulties experienced using conventional constructions is that of limited "wet stand" life, i. e. a battery has a tendency to discharge itself immediately upon admitting electrolyte between the plates. The reasons for such self-discharge are not completely understood. To overcome it, it has been necessary to add the electrolyte within a relatively short time, usually not more than a few hours, before the battery is to be actually used. Observations show that plates of the present design have a longer "wet stand" life, which is attributed in large degree to the elimination of the unbonding difficulties mentioned above.

Figure 7:
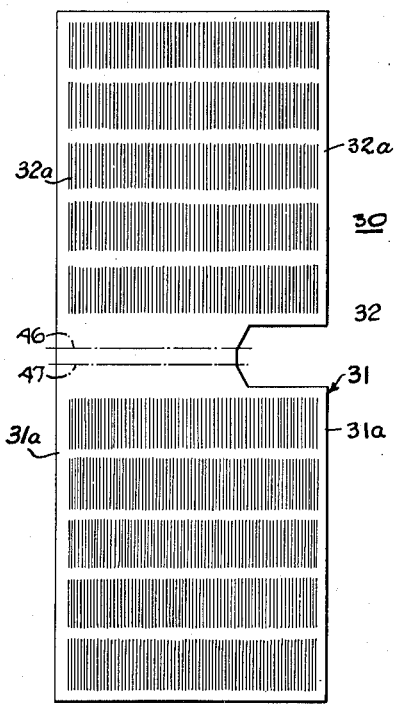
Fig. 7 shows a blank including louvers and prior to the folding operation.
Figure 8:
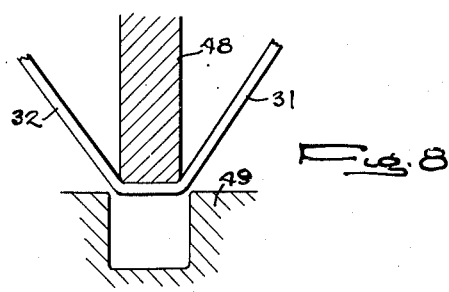
Fig. 8 shows the procedure used for forming the blank into a pair of negative plates.

In accordance with one of the aspects of the invention, the louvers in a pair of plates may be formed simultaneously by providing a blank as shown in Fig. 7. Here the blank, indicated at 30, has portions 31, 32. In order to form a pair of plates it is sufficient to crease the blank along the lines 46, 47. This may be accomplished as shown in Fig. 8 by the pair of dies 48, 49. In the latter figure the dies are just beginning to come together, and when they are fully engaged the plates occupy the parallel position shown in Fig. 3. Assembly of a battery is facilitated since the plates are more compact and resist bending. In addition each plate is in one piece and there is no danger that short lengths of wire will strip off to form a short circuiting path.

The plates are inexpensive since they may be die-formed of inexpensive stock in a fraction of the time it takes to cut zinc screen in the desired shape. The louvered construction described herein not only results in a plate having minimum electrical resistance but one which offers minimum resistance to the circulation of electrolyte along the surface of the plate.

I claim as my invention:

1. In a battery, a plate having a terminal portion at the top edge thereof, said plate having integral louvers formed therein and extending over substantially the entire plate area below said terminal portion, said louvers extending parallel to one another generally in the direction of said terminal portion and having opposite edges which project beyond the opposite faces of the plate.

2. In a battery, a plate having a terminal portion including a conducting strip extending along the top edge of the plate, louvers integrally formed in said plate below said conducting strip, said louvers being arranged generally at right angles to said conducting strip, each of said louvers having a width which is not more than about 5 times the thickness of the plate.

3. In a battery, a plate having a terminal portion including a header extending along the top edge of the plate, louvers integrally formed in said plate below said header, said louvers being arranged in rows transversely of the plate separated by transverse ribs and with individual louvers extending generally at right angles to said header, and risers integrally formed in said plate interconnecting said ribs and said header.

4. In a battery, a plate having a terminal portion including a header extending along the top edge of the plate, louvers integrally formed in said plate below said header, said louvers being arranged in transverse rows across said plate with the rows separated so as to define unlouvered transverse ribs, said louvers extending generally in the direction of said header, said plate having unlouvered risers extending vertically along its opposite edge portions and integrally connected to said transverse ribs at the end of the latter.

5. In a battery, a plate having a terminal portion at the top edge thereof, said plate having integral louvers formed therein and extending over substantially the entire plate area below said terminal portion, each of said louvers having a constant width along the length thereof and equal to the opening which remains when the louver is integrally formed so that the resistance of the plate in the direction of current flow is substantially the same as compared to the resistance of the blank from which the plate is formed.

6. In a battery, a pair of negative plates, each of said plates having a header along its upper edge portion and having integral louvers formed over substantially the entire area thereof extending in the direction of said header, said plates being interconnected at their upper edges along a major portion of their width by a transverse integral connector so that the plates taken together form a box-like U-shaped structure with the upper portions of the plates accurately spaced with respect to one another.

7. In a battery, a plate having a terminal portion including a header extending along the top edge of the plate, louvers integrally formed in said plate below said header, said louvers being arranged in transverse rows across said plate with the rows separated so as to define unlouvered transverse ribs, said louvers extending generally in the direction of said header, said plate having unlouvered risers along its edge portions and integrally connected to said transverse ribs at the ends of the latter.

References Cited in the file of this patent

UNITED STATES PATENTS

| Number | Name | Date |
| --- | --- | --- |
| 696,171 | Hassler | Mar. 25, 1902 |
| 1,220,604 | Cartwright | Mar. 27, 1917 |
| 1,631,568 | Yngve | June 7, 1927 |

FOREIGN PATENTS

| Number | Country | Date |
| --- | --- | --- |
| 212,425 | Germany | July 26, 1907 |
| 677,424 | France | Dec. 9, 1929 |